United States Patent

Wolpers et al.

[11] Patent Number: 5,100,967
[45] Date of Patent: Mar. 31, 1992

[54] STATISTICAL AB-BLOCK COPOLYMERS HAVING IMPROVED PROPERTIES, PROCESS FOR THEIR MANUFACTURE AND THEIR USE

[75] Inventors: Jürgen Wolpers, Haltern; Christoph Herrmann, Marl; Walter Hellermann, Dorsten, all of Fed. Rep. of Germany

[73] Assignee: Huels AG, Marl, Fed. Rep. of Germany

[21] Appl. No.: 749,516

[22] Filed: Aug. 19, 1991

Related U.S. Application Data

[63] Continuation of Ser. No. 461,019, Jan. 4, 1990, abandoned.

[30] Foreign Application Priority Data

Feb. 21, 1989 [DE] Fed. Rep. of Germany ....... 3905269

[51] Int. Cl.$^5$ ..................... C08F 297/04; C08L 53/02
[52] U.S. Cl. .................................... 525/314; 525/271; 525/317; 525/95; 524/495
[58] Field of Search ................. 525/314, 271; 524/495

[56] References Cited

U.S. PATENT DOCUMENTS 4,782,119 11/1988 Tsutsumi et al. ................... 525/314
4,814,386 3/1989 Hellermann et al. ............... 525/314

Primary Examiner—John C. Bleutge
Assistant Examiner—Vasu S. Jagannathan
Attorney, Agent, or Firm—Oblon, Spivak, McClelland, Maier & Neustadt

[57] ABSTRACT

Statistical AB-block copolymers having improved properties, a process for their manufacture and their use. Tire treads made of the statistical AB block copolymers according to the invention are characterized by high skid resistance under wet conditions combined with persistently low abrasion, good dynamic properties and rapid vulcanization.

12 Claims, No Drawings

STATISTICAL AB-BLOCK COPOLYMERS HAVING IMPROVED PROPERTIES, PROCESS FOR THEIR MANUFACTURE AND THEIR USE

This application is a continuation of application Ser. No. 07/461,019, filed on Jan. 4, 1990, now abandoned.

BACKGROUND OF THE INVENTION

1. Field of the Invention

The invention relates to statistical block copolymers having improved properties, process for their manufacture and their use.

2. Discussion of the Background

Numerous statistical copolymers based on conjugated dienes and styrene are known which serve for the manufacture of tire treads. More specifically, reference is made to 1. Statistical butadiene-isoprene-styrene copolymers,
2. Block copolymers based on dienes and a vinyl aromatic compound, and
3. AB-block copolymers based on butadiene, isoprene and styrene. Regarding 1:

From DE-OS 33 10 118 vulcanizable compositions are known which comprise as an essential component polyisoprene and/or amorphous isoprene-styrene copolymers. The polymers are manufactured at different starting and end temperatures.

German patent application P 37 24 870.7 relates to a process for the manufacture of copolymers based on butadiene, isoprene and styrene in which an ethylene glycol ether of the formula $R_1$-O- $CH_2$ - $CH_2$ -O- $R_2$ is employed as a cocatalyst. $R_1$ and $R_2$ are alkyl groups having variable numbers of carbon atoms from the groups methyl, ethyl, propyl and butyl. According to that process, copolymers are available in which more than 70% of the isoprene units are present in the 1,2-and 3,4-positions and more than 60% of the butadiene units are in the 1,2-position.

Regarding 2:

Two-block copolymers in particular find wide application in the tire field. Thus, e.g. Japanese 74/37,415 describes a rubber composition for tire treads which comprises at least 30% by wt. of a statistical block copolymer based on butadiene and an aromatic vinyl compound, serving as a rubber component. Both blocks A and B contain up to 35% by wt. of the aromatic vinyl compound; however, they differ in respect of vinyl content; whereas block A contains 10 to 20% by wt. of vinyl groups, 40 to 95% thereof are contained in block B. The ratio of the two blocks A/B lies between 20:1 and 1:20. The block copolymer is obtainable by a two-stage Li polymerization of butadiene and aromatic vinyl compounds.

German patent specification 28 58 063 discloses an elastomer composition comprising a copolymerization product based on styrene and butadiene or styrene and isoprene and 5 to 25% by wt. of butadiene terminal blocks at the ends. The elastomer composition permits the manufacture of tire treads which are improved with respect of heat build-up and rolling resistance. Their Tg is preferably in the range of $-45°$ to $-20°$.

The rubber materials described in DE-PS 31 51 139 comprise in addition to a diene rubber a statistical styrene-butadiene block copolymer having a styrene content of 10 to 40%. The blocks A and B differ both in respect of styrene as well as vinyl content. Block A has a styrene content of 20 to 50% and a vinyl content between 40 and 75%. In block B the styrene content amounts to a maximum of 10% and the vinyl content is between 20 and 50%. The vinyl contents in that case refer to the total butadiene units of the respective block.

DE-OS 32 20 680 discloses a rubber composition containing as an essential ingredient a coupled block copolymer of a conjugated diene and a vinyl aromatic compound. The block copolymer thus always comprises only two monomers. For this rubber composition an excellent matching of wet skidding resistance and rolling resistance is claimed.

The rubber compositions of DE-OS 35 30 438 contain at least 20% of a styrene-butadiene-AB-block copolymer comprising at least 20% by wt. of each of block A and block B. The block A has a styrene content of 10 to 80% and a mean content of vinyl compounds in the butadiene portion of 30 to 70% by wt. The block B consists of polybutadiene units having a mean content of vinyl compound not exceeding 60% by wt.

EP-PS 0 054 440 and EP-PS 0 134 909 claim statistical styrene-butadiene 2-block and 3-block-copolymers having good wet anti-skid properties, rolling resistance and abrasion resistance. The processability and the cold flow are merely adequate according to the description by the patentee (see EP-PS 054 440, page 1, line 54).

The 2-block copolymers of EP-PS 0 054 440 comprise a block A having a styrene content of 10 to 50% and a vinyl content of 20 to 50% and a block B having a styrene content of 1 to 30% and a vinyl content exceeding 60%. The triple block copolymers in addition comprise a polybutadiene block having a vinyl content of 10 to 50%. The vinyl content in that case as well relates to the total butadiene units of the respective block. The 2-block copolymers of EP PS 0 134 909 comprise a block A having a styrene content of 20 to 50% and a block B having a styrene content of 0 to 10% and a vinyl content of more than 20% and up to 50%.

Thus, according to the art, statistical copolymers based on butadiene, isoprene and styrene are known on the one hand. These copolymers, however, suffer from high abrasion. In addition they are vulcanized relatively slowly.

On the other hand, isoprene-free AB block copolymers based on butadiene and styrene are also known. However, these systems have drawbacks as well. For example, the skid resistance of tire threads of these polymers is still inadequate.

A person skilled in the art could not have expected that by the inclusion of isoprene and otherwise keeping the damping maximum unchanged, an improvement of the skid resistance would be attained, since it was known from the literature that the skid resistance is essentially dependent on the glass transition temperature Tg and thus on damping, which for both polymers exhibits the same maximum (Nordsiek: Kautschuk und Gummi, 38, (1985), page 179).

Regarding 3:

Finally DE-PS 34 14 657 and DE-OS 34 24 699 claim heat vulcanizable tread strips for the manufacture of tire treads. A block copolymer based on butadiene, isoprene and optionally styrene and/or piperylene, which is not to contain polystyrene blocks and comprises a mean vinyl content of 45-80% is mentioned as a rubber component.

The glass transitions of the individual chain segments of the block polymers cover a Tg range or 2 or 3 partial ranges starting at −5° to −20° C. and ending at −50° to −105° C. The damping curve exhibits a distinct, blunt maximum. The manufacture proceeds by polymerization, a cocatalyst being added right at the beginning, whereafter the temperature is raised.

From German patent application P 37 24 871.5, elastomeric AB-block copolymers based on butadiene, isoprene and styrene are known, which consist of 40 to 80% of a block A having a content of uniformly distributed vinyl groups of 8 to 80% and 60 to 20% of a block B having a vinyl content of 75 to 90%.

German patent application P 38 18 870.8, describes unsaturated, elastomeric AB-block copolymers based on butadiene, isoprene and styrene comprising from 30 to 90% of a block A and, correspondingly, 70 to 10% of a block B, the mean vinyl and isopropenyl group contents of which each are higher by at least 30% than those of block A.

In the two aforesaid block copolymers the content of block A in the first case exceeds 40% by wt. and in the second case 30% by wt. Those block copolymers exhibit a high degree of damping over a very wide temperature range and a balanced combination of properties in respect of skidding, abrasion and dynamic properties.

SUMMARY OF THE INVENTION

Accordingly, one object of the present invention is to provide an improved block copolymer having good dynamic properties and anti-skid properties as well as excellent abrasion resistance.

This and other objects have been achieved by the present statistical unsaturated two-block copolymers. The block copolymers of the present invention comprise 25-75 wt.% 1,3-butadiene, 5-65 wt.% isoprene and 3-35 wt.% styrene. The scope of the present invention includes the AB-block copolymers and tire treads of the present invention as well as a method of preparing the same.

DETAILED DESCRIPTION OF THE PREFERRED EMBODIMENTS

It has now been found surprisingly that with very good dynamic properties the anti-skid properties can be improved without impairing abrasion to the previously usual extent. In addition, an accelerated vulcanization of these 2-block copolymers was surprisingly observed when compared with statistical copolymers.

The AB-block copolymers according to the invention based on 25 to 75% butadiene, 5 to 65% isoprene and 3 to 35% styrene are composed of a block A1 composed of 50 to 100% butadiene monomer units having a content of uniformly distributed vinyl groups of 8 to 40% and correspondingly 15 to 0% styrene monomer units or 20 to 0% isoprene monomer units having a 1,4 monomer content of at least 60%, or a block A2 composed of 50 to 95% butadiene monomer units, 3 to 30% isoprene monomer units and 2 to 15% styrene monomer units wherein the diene units have a content of vinyl and isopropenyl groups of 8 to 40%; and a block B containing 3 to 65% butadiene monomer units, at least 16% isoprene monomer units and 3 to 45% styrene monomer units, the diene units having a content of vinyl and isopropenyl groups of 45 to 90%.

These $A_1B$-block and $A_2B$-block copolymers are compatible and exhibit high damping over a narrow temperature range, i.e. both blocks form a single phase, the single damping maximum of which is in the range of −45° to +15° C. see Donald S. Kaplan, J. Appl. Pol. Sci., Vol. 20, pages 2615-2619 (1976).

The AB block copolymers may be linear as well as branched. Branching may be attained by means of a branching agent during the polymerization or by means of a coupling agent at the end of the polymerization.

The process for the manufacture of the block copolymers by anionic polymerization of the polymers in an inert organic solvent in the presence of an organolithium compound is characterized in that initially the first block $A_1$ or $A_2$ is produced by polymerization of the respectively required monomers, if desired or required, in the presence of a small amount of a cocatalyst. Thereafter a block B is produced by polymerizing a mixture of butadiene, isoprene and styrene in the presence of a cocatalyst. The process is described in detail below.

An inert organic solvent is used as the reaction medium. Particularly suitable are hydrocarbons having 6 to 12 carbon atoms, e.g. pentane, hexane, heptane, octane and decane as well as their cyclic analogues. Also suitable are aromatic solvents such as e.g. benzene, toluene, xylene and others. It stands to reason that mixtures of these solvents can be employed as well.

Alkyl lithium compounds are employed as catalysts which can readily be obtained by the conversion of lithium with the corresponding alkyl halides. The alkyl groups have 1 to 10 carbon atoms. Individual hydrogen atoms can be substituted by phenyl groups. The following alkyl lithium (organolithium) compounds are particularly suitable: methyl lithium, ethyl lithium, n-butyl lithium and pentyl lithium, where n-butyl lithium is preferred.

In order to improve the cold flow, at least one polymerization stage is preferably carried out in the presence of small amounts of a branching agent, such as, e.g., divinyl benzene (DVB). Based on 100 parts monomer a maximum of 0.5 parts DVB is employed. Such addition is dispensed with if a coupling is provided for after the polymerization.

The nature and amount of catalyst and branching agent are generally so selected that the resulting block copolymer has the following properties: Mooney viscosity ($ML_{1-4}$ 100° C., DIN 53 523): 30 to 130; Non-uniformity $U = (M_w/M_n) - 1$, determined by gel permeation chromatographic analysis (GPC analysis): 0.6 to 3.0;

In the present process the block B is manufactured in the presence of cocatalyst. A feature of the invention resides in the fact that this block, as compared with the first block, has an increased content of 1,2 and/or 3,4 structural units.

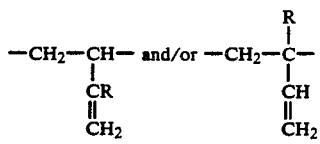

R = H (Butadiene)
R = CH₃ (Isoprene)

The cocatalyst is generally selected from the groups of ethers or tertiary amines. Obviously mixtures of different cocatalysts may be employed as well.

Suitable ethers include, in particular, dialkyl ethers of ethylene glycol and diethylene glycol, the alkyl groups of which each comprise up to 4 carbon atoms, e.g., ethylene glycol diethyl ether (DEE).

For the manufacture of branched block copolymers, ethers of the general formula $$R_1\text{-O-CH}_2\text{-CH}_2\text{-O-R}_2$$

are preferred where $R_1$ and $R_2$ represent alkyl groups having different numbers of carbon atoms from the groups methyl, ethyl, n- and isopropyl as well as n-, iso-, sec.- and tert-butyl. Preferably the sum total of the carbon atoms of the two groups $R_1$ and $R_2$ is 5 to 7, in particular 6. A particularly suitable ethylene glycol ether is the compound wherein $R_1$ is ethyl and $R_2$ is tertiary butyl.

Suitable tertiary amines are, e.g., N,N,N',N'-tetramethyl ethylene diamine, N,N,N',N'-tetraethyl ethylene diamine and triethylene diamine.

The cocatalyst is employed in a ratio of 2:1 to 30:1, preferably 2:1 to 15:1, based on the molar amount of the catalyst. At higher temperatures larger amounts of cocatalyst are generally required in order to attain the desired microstructure regulating effect. Reaction temperatures of 100° C. should not be exceeded. It is also possible to operate with rising or falling temperatures. However, in this case care must be taken that the microstructure is not basically modified.

In the manufacture of A the amount of cocatalyst used depends on the desired vinyl group content. The ratio of the monomers and the amount of cocatalyst are so selected that the desired damping maximum is attained.

In the manufacture of the block copolymer, styrene is added as a comonomer. Care must be taken by suitable expedients, that the content of polystyrene blocks in the AB-block copolymer does not exceed 2.5% by wt. A process for determining the content of polystyrene blocks is described in the textbook Houben-Weyl "Methoden der Organischen Chemie", Volume 14/1 (1061), page 698.

It is known that certain compounds proposed as cocatalysts have the property of suppressing the formation of polystyrene blocks. Compounds known as randomizers and which are generally alkali metal salts of alcoholates, as well as organic carboxylic and sulphonic acids, have the same property.

According to a special embodiment of the process, the "live polymers" present at the end of the polymerization of blocks $A_1$ or $A_2$ are reacted with a coupling agent to produce branched or star-shaped block copolymerization products after formation of block B.

Suitable coupling agents are polyepoxides such as epoxidized linseed oil, polyisocyanates, polyketones such as 1,3,6-hexanetrione, polyanhydrides such as, for example, the dianhydride of pyromellitic acid and dicarboxylic acid esters such as adipic acid dimethyl esters. Particularly suitable are (a) the tetrahalides of the elements Si, Ge, Sn and Pb, in particular $SiCl_4$, (b) organic compounds of the general formula $R_n(SiX_3)_n$, where n=1 to 6 and X is a halogen in particular n=1 and 2. In this formula R is an organic group having a valency of n, for example an aliphatic, cycloaliphatic or aromatic group having 6 - 16 carbon atoms, for example 1,2,4-tris(2-trichlorosilylethyl)-cyclohexane, 1,8-bis(trichlorosylyl)-octane, and 1-(trichlorosilyl)octane, (c) organic compounds which contain at least one group $R_2'SiX_2$, where R is an alkyl group containing 1 to 10 carbon atoms and X is halogen, e.g., dimethylsilylchloride, (d) halogen hydrosilanes of the general formula $Si(H)_m(X)_{4-m}$, where m is 3 to 1, and (e) di- and trivinylbenzenes, e.g. 1,4-divinylbenzene. It is particularly advantageous to use divinylbenzene as a coupling agent.

The process may be conducted discontinuously as well as continuously.

The person skilled in the art will be able, by means of the damping curve, to produced block copolymers which can be processed into tire treads having the desired combinations of properties by varying the reaction conditions.

The amorphous polymers obtained can be mixed with active reinforcing fillers, a vulcanizing agent and conventional additives if they are to be converted into vulcanization products. Generally speaking, it is necessary to carry out such mixing in the presence of shear force effects.

Compositions which are intended for the manufacture of tire treads are generally formed as camelbacks. During the homogenization and moulding, which may for example take place in an extruder, the conditions of temperature and time are so selected that no vulcanization takes place.

The copolymers of the present invention may be used in the manufacture of tire treads in the form of vulcanizable compositions comprising at least 15 parts by weight of the block copolymer, 95-5 parts by weight of an elastomer or rubber component different from the copolymer of the present invention having a glass transition temperature below −30° C., 40-80 parts by weight of a filler and up to 5 parts by weight of a vulcanizing system comprising a vulcanizing agent and if desired or required, a vulcanizing activator. Natural rubbers, diene rubbers and styrene-butadiene rubbers may be used as the elastomer which is different from the copolymer of the present invention.

The rubber component in the vulcanizable compositions preferably comprises at least 15 per cent by wt. of a block copolymer according to the invention. The remaining rubber components are the known amorphous general purpose rubbers, e.g., styrene-butadiene rubber, 1,4-cis-polybutadiene, 1,4-cis-polyisoprene and natural rubber.

Active, reinforcing fillers are for example carbon black compositions of various activities, optionally treated with silane bonding agents, highly dispersed silicic acids and mixtures thereof.

Conventional vulcanizing agents contain, e.g., sulphur in combination with accelerators. The amount of vulcanizing agents depends on the remaining components in the vulcanizable composition and can be determined by simple preliminary tests.

Plasticizer oils as conventionally used in rubber technology, preferably aromatic, aliphatic and naphthenic hydrocarbons and conventional auxiliaries, for example zinc oxide, stearic acid, rosin acids, aging protective agents and ozone protective waxes may serve as additives, added in conventional quantities.

The block copolymers according to the invention, are suitable for the manufacture of tire treads for automobile tires and truck tires, not only for the manufacture of new tires, but also for the retreading of old tires.

The tire treads are characterized in particular by the following advantageous properties:

A) high damping and resulting therefrom, high wet skid resistance with equally good abrasion properties, B) good dynamic properties, apparent from the levels of rebound elasticity and ball fatigue, and C) rapid vulcanization.

These improved properties are clearly apparent when compared with known products.

As was mentioned above, statistical copolymers based on butadiene, isoprene and styrene, suffer from comparatively high abrasion as is clearly apparent from comparative experiments B and C (232 and 247 mm$^3$ respectively) according to Table 5.

In addition, they vulcanize relatively slowly, in terms of the $t_{90}$ value, e.g. of comparative examples B and C (30 and 29 min, respectively). The $t_{90}$ value denotes the point in time at which, according to the vulcameter curve, 90% of the torque of the final condition has been attained, i.e. 90% complete vulcanization. By comparison, the polymer according to the invention in Example 2, in spite of a higher glass transition temperature Tg (the vulcanization gets slower, the higher the glass transition temperature is) exhibits a significantly lower $t_{90}$ value (19.9 min) and thus a substantially faster vulcanization. However, it is significant that slow vulcanization, as in the comparative examples, also tends to result in so-called Marching-Modulus performance. This term denotes polymers, the vulcanization of which does not lead to a defined end point in respect of modulus or torque, rebound elasticity and hardness, but which instead result in continuously changing vulcanizing properties with increasing heating time. This is obviously extremely undesirable in industry. This undesirable performance is clearly reduced and even eliminated by the manufacturing process according to the invention as apparent from the shortened $t_{90}$ values of the examples. In addition, the dynamic properties of the comparative examples, rated in terms of heating up in the ball fatigue test are clearly less favourable.

Isoprene AB-block copolymers on the basis of butadiene and styrene (comparative examples A and D in Table 5) have only a very low temperature gradient of the rebound elasticity. This means that on the one hand the skid resistance of a tire tread manufactured from such polymer can only be very defective having a room temperature elasticity value of 30% (comparative Example A). Even comparative Example D exhibits an inadequate skid resistance at a rebound elasticity of 20%.

By comparison Example 3 according to the invention where the damping maximum is at the same temperature as that of comparative Example A, provides a rebound elasticity of only 13%, according to which a substantially improved skid resistance is to be expected. From experience it is known that the anti-skid properties (corresponding to rebound elasticity at room temperature) and abrasion resistance vary in opposite directions. An evaluation of polymers having different dampings, is nevertheless possible by employing the formula $$\text{DIN-abrasion} = 274.5 - 6.47 \times E1$$

where E1 is the rebound elasticity at room temperature), which is applicable for elasticity values between about 5 and 30% using rubber mixtures of the same formulation. According to this formula, nominal values for the DIN-abrasion were calculated with reference to the measured rebound elasticities, both for the examples according to the invention as well as for the comparative examples. These values (see Table 5) demonstrate the superiority of the polymers according to the process of the invention.

In Examples 1 and 2 and also in 4 to 7 the actually measured abrasion data are clearly lower than calculated. In Example 3 the measured abrasion is slightly higher, however, the polymer of that example exhibits excellent dynamic properties as demonstrated by the low heating up and the long running period in the ball fatigue test. In comparative Examples A and C the measured abrasion is clearly higher than according to the formula. In comparative Examples B and D the measured abrasion is equal to the calculated abrasion. However, in that case the dynamic properties are resoundingly bad. Thus the vulcanization product in Comparative Example B survives only two stages in the ball fatigue test and suffers the highest heating up of all polymers listed. This corresponds to a quite drastically reduced level of the dynamic properties. Comparative example D as well, demonstrates dynamic properties which are substantially poorer as compared with the example of the invention, as apparent from the lower rebound elasticity at 75° C as well as the substantially higher end temperature after dynamic testing in the so-called Goodrich flexometer. Quite generally for the vulcanization products of comparative examples A to D, a strikingly lower level of the rebound elasticity at 75° is apparent as compared with the inventive examples, in each case based on a comparable damping maximum.

If all properties of the polymer vulcanization products which have been taken into account, including their dynamic properties, are considered in combination, some clear advantages arise in respect of the examples according to the invention regarding the overall properties as compared with the comparative examples.

Other features of the invention will become apparent in the course of the following descriptions of exemplary embodiments which are given for illustration of the invention and are not intended to be limiting thereof.

EXAMPLES

A hydrocarbon mixture containing about 50% hexane was used as the solvent. Further components of this hydrogenated C$_6$ fraction included in particular pentane, heptane and octane as well as their isomers. The solvent was dried over a molecular sieve having a pore width of 0.4 nm, so that the water content was lowered below 10 ppm, followed by stripping with N$_2$.

The organic lithium compound was n-butyl lithium which, in the absence of contrary indications, was employed in the form of a 15% by wt. solution in hexane.

The monomers isoprene and styrene were boiled prior to their use for 24 hours over calcium hydride under reflux, distilled and fully titrated with n-butyl lithium in the presence of o-phenanthroline.

The glycol ethers were fully titrated with n-butyl lithium in the presence of o-phenanthroline.

The divinyl benzene (DVB) was present as a mixture of m- and p-divinylbenzene and was employed in the form of a 64% solution in hexane.

The damping curves were recorded using a torsion pendulum according to Schmieder-Wolf and DIN 53 445. The vulcameter tests took place according to DIN 53 529.

The microstructure of the copolymerization product was determined by IR-spectroscopy. The conversion was determined gravimetrically, i.e. by determining the solids wt. of a stopped polymerization product sample. The Defo hardness (DH) and the Defo elasticity (DE) were determined in conventional measuring procedures (DIN 53 514). Proportions are expressed as parts by wt., percentages (%) as percent by wt.

EXAMPLE 1

276 parts hexane, 30 parts 1,3-butadiene and 0.02 parts DVB were initially introduced into a first V2A stainless steel autoclave rinsed with dry nitrogen and titrated with thermoelectric control with n-butyl lithium (BuLi). The polymerization was started at 50° C. by the addition of 0.051 parts BuLi. The temperature rose briefly to 55° C. in spite of cooling. After 128 minutes, after the 1,3-butadiene had been converted virtually completely, an IR sample was taken and further processed in the same manner as the final product.

Immediately thereafter and within 43 seconds the contents of a second V2A stainless steel agitating autoclave (40° C.) were added. The latter contained a solution titrated with BuLi of 23 parts 1,3-butadiene, 28 parts isoprene, 19 parts styrene and 0.75 parts diethoxyethane in 192 parts hexane. The temperature was kept constant at 51° C. After 142 minutes the polymerization was stopped by the addition of a solution of 0.5 parts 2,2'-methylene-bis-(4-methyl-6-tertiary butyl phenol) in 2 parts moist toluene. The solvent was distilled off with steam and the polymerization product was dried for 24 hours at 70° C. in a circulatory air cabinet.

EXAMPLES 2 TO 6 AND COMPARATIVE EXAMPLES A AND D

To the extent that they do not correspond to Example 1, the reaction conditions are listed in Table 1. In Examples 4, 5 and 6 the entire amount of monomer was pre-introduced in the first autoclave. After a partial conversion only the ether was metered in.

The comparative examples A and D contain only butadiene and styrene as the monomers.

COMPARATIVE EXAMPLES B AND C

All starting materials were pre-introduced as stated in Table 2 in a stainless steel V2A agitating autoclave rinsed with dry nitrogen. After thermoelectric control of the titration with BuLi the polymerization was started by the addition of BuLi and was carried out in the stated temperature range and time. Further processing proceeded as described in Example 1.

TABLE 1

|  | Example 2 | Example 3 | Comparative examples A | Comparative examples D |
|---|---|---|---|---|
| 1st Autoclave |  |  |  |  |
| Parts hexane | 276 | 275 | 275 | 200 |
| Parts butadiene | 20 | 10 | 20 | 33.4 |
| Parts isoprene | — | — | — | — |
| Parts styrene | — | — | — | — |
| Parts DBV | 0.02 | 0.02 | 0.015 | 0.01[1] |
| Starting with BuLi | 0.05 | 0.04 | 0.051 | 0.056 |

TABLE 1-continued

| Addition of the 2nd Autoclave |  |  |  |  |
|---|---|---|---|---|
| after minutes | 152 | 110 | 146 | 136 |
| convers. attained | 100 | 100 | 100 | 99 |
| Parts butadiene | 26 | 29 | 57 | 43.2 |
| Parts isoprene | 32 | 36 | — | — |
| Parts styrene | 22 | 25 | 23 | 23.4 |
| Parts hexane | 190 | 190 | 190 | 268 |
| Parts ether | 0.75*) | 0.1*) | 0.75*) | 0.4**) 0.12[2] |
| End of the polymerization after further minutes | 118 | 310 | 124 | 164[3] |

|  | Example 4 | Example 5 | Example 6 | Example 7 |
|---|---|---|---|---|
| 1st Autoclave |  |  |  |  |
| Parts hexane | 470 | 470 | 470 | 470 |
| Parts butadiene | 40 | 40 | 50 | 30 |
| Parts isoprene | 40 | 40 | 25 | 60 |
| Part styrene | 20 | 20 | 25 | 10 |
| Parts DBV | 0.015 | 0.015 | 0.015 | 0.02 |
| Starting with BuLi | 0.04 | 0.04 | 0.044 | 0.042 |
| Addition of the 2nd autoclave |  |  |  |  |
| after minutes | 29 | 64 | 30 | 74 |
| conversion attained | 9 | 20 | 11 | 21 |
| Parts butadiene | — | — | — | — |
| Parts styrene | — | — | — | — |
| Parts hexane | — | — | — | — |
| Parts ether | 1.0**) | 1.0**) | 1.0**) | 0.75**) |
| End of the polymerisation after further minutes | 121 | 116 | 120 | 140 |

*)1,2-diethyl ethane (DEE)
**)1-tert.-butoxy-2-ethoxy ethane (BEE)
[1])0.01 parts cocatalyst BEE
[2])0.1 parts randomizer sodium alkyl benzene sulphonate (MW 346 g/mol)
[3])After completed polymerization, 0.04 parts SnCl₄ were added and reacted at 60° C. for 60 minutes.

TABLE 2

|  | Comparative Examples B | Comparative Examples C |
|---|---|---|
| Parts hexane | 400 | 400 |
| Parts butadiene | 30 | 40 |
| Parts isoprene | 60 | 40 |
| Parts styrene | 10 | 20 |
| Parts DVB | 0.02 | 0.025 |
| Parts ether | 1.0**) | 0.75**) |
| Start with BuLi (Parts) | 0.06 | 0.038 |
| Temperature (° C.) |  |  |
| start | 35 | 40 |
| end | 69 | 88 |
| Minutes | 66 | 90 |

*)DEE
**)BEE
Comparative example A corresponds to JP-AS 74/37,415. Comparative examples B and C correspond to German patent application P 37 24 870.7. Comparative example D corresponds to Example 2 of DE-OS 32 20 680.

TABLE 3

Percentage composition of the polymer blocks A and B, obtained by the polymerization of the following monomers

| Example | Block | Butadiene trans-1,4 | 1,2*) | cis-1,4 | Isoprene 3,4 | 1,4 | Total styrene | Block-proportions |
|---|---|---|---|---|---|---|---|---|
| 1 | A₁ | 52 | 14 | 34 | — | — | — | — |
|  | B | 18 | 21 | 13 | 24 | 4 | 20 | <0.5 |
| 2 | A₁ | 53 | 14 | 33 | — | — | — | — |
|  | B | 13 | 22 | 10 | 25 | 6 | 24 | <0.5 |
| 3 | A₁ | 54 | 12 | 34 | — | — | — | — |
|  | B | 14 | 18 | 10 | 21 | 11 | 26 | 1.8 |

TABLE 3-continued

| | Block | Butadiene trans-1,4 | 1,2*) | cis-1,4 | Isoprene 3,4 | 1,4 | Total styrene | Block-proportions |
|---|---|---|---|---|---|---|---|---|
| 4 | A$_2$ | 41 | 13 | 23 | 5 | 14 | 4 | n.d |
| | B | 7 | 30 | 7 | 30 | 5 | 21 | 0.5 |
| 5 | A$_2$ | 36 | 16 | 21 | 8 | 13 | 6 | n.d |
| | B | 10 | 25 | 9 | 28 | 6 | 22 | 0.4 |
| 6 | A$_2$ | 30 | 20 | 24 | 5 | 7 | 6 | n.d |
| | B | 10 | 34 | 8 | 17 | 5 | 26 | <0.5 |
| 7 | A$_2$ | 36 | 11 | 18 | 9 | 24 | 2 | n.d. |
| | B | 8 | 21 | 7 | 42 | 11 | 11 | <0.5 |
| Comparative example | | | | | | | | |
| A | A | 51 | 15 | 33 | — | — | — | n.d |
| | B | 16 | 45 | 12 | — | — | 27 | n.d. |
| B | | 4 | 26 | 5 | 48 | 5 | 12 | <0.5 |
| C | | 6 | 30 | 4 | 29 | 7 | 24 | n.d |
| D | A | 40 | 21 | 29 | — | — | — | — |
| | B | 21 | 40 | 14 | — | — | 25 | 1.5 |

*)including 1,2-isoprene
n.d. = not determined

TABLE 4

Characterization of polymers.

| | Mooney viscosity | DN/DE | Max Damping (°C.) |
|---|---|---|---|
| Example | | | |
| 1 | 36 | 300/11 | +1 |
| 2 | 33 | 350/10 | +4 |
| 3 | 67 | 900/24 | −8 |
| 4 | 40 | 350/10 | +8 |
| 5 | 59 | 675/16 | +5 |
| 6 | 40 | 400/10 | +6 |
| 7 | 35 | 350/13 | ±0 |
| Comp. Example | | | |
| A | 84 | 1950/28 | −8 |
| B | 43 | 400/15 | +8 |
| C | 62 | 825/23 | +6 |
| D | 45 | 675/21 | −16 |

Vulcanization properties

From the AB-block copolymers according to the invention and the comparative examples, vulcanization mixtures of the following composition were produced and subjected to thorough testing:
100: parts AB block copolymer
50: parts carbon black N 339
8: parts highly aromatic oil
3: parts zinc oxide
1: parts stearic acid
1: parts N-isopropyl-N'-phenyl-p-phenylene diamine (VULKANOX ®4010 NA)
2: Parts KORESIN ® conversion product of p-tert.-butyl phenol acetylene
0.6: Parts N-cyclohexyl-1-benzothiazole sulfenamide (CBS, VULKAZIT ® CZ)
0.3: Parts diphenyl guanidine (DPG, VULKAZIT ® DZ)
0.6: Parts N,N'-dimorpholyl disulphide (SULFASAN ® R)
1.7: Parts sulphur The products VULKANOX 4010 NA, VULKANOX 4020, VULKAZIT CZ and VULKAZIT DZ are obtainable from Bayer AG, Leverkusen, SULFASAN R from Monsanto and KORESIN from BASF AG, Ludwigshafen.

The physical data obtained are shown in the following table.

Obviously, numerous modifications and variations of the present invention are possible in light of the above teachings. It is therefore to be understood that within the scope of the appended claims, the invention may be practiced otherwise than as specifically described herein.

TABLE 5

| | | Characteristics of the polymers | | | | | | | | | | |
|---|---|---|---|---|---|---|---|---|---|---|---|---|
| | | Examples | | | | | | | Comparative Examples | | | |
| | | 1 | 2 | 3 | 4 | 5 | 6 | 7 | A | B | C | D |
| Vulcameter 150° C. | t$_{10}$ min | 11.1 | 10.4 | 8.7 | 13.7 | 12.3 | 14.4 | 8.8 | 15.0 | 14.2 | 12.3 | 10.7 |
| | t$_{90}$ min | 16.6 | 19.9 | 16.4 | 25.5 | 21.8 | 27.2 | 16.4 | 36.8 | 30.2 | 28.9 | 19.3 |
| Tensile strength | MPa | 15.9 | 17.8 | 18.6 | 10.5 | 11.6 | 15.8 | 16.2 | 16.4 | 13.7 | 11.3 | 15.5 |
| Ductile yield | % | 370 | 399 | 476 | 226 | 277 | 362 | 418 | 410 | 407 | 349 | 432 |
| DIN-abrasion | mm$^3$ | 185 | 217 | 198 | 224 | 218 | 205 | 195 | 199 | 232 | 247 | 153 |
| Hardness | 22° C. Shore A | 72 | 73 | 72 | 76 | 73 | 72 | 68 | 75 | 74 | 67 | 65 |
| | 75° C. Shore A | 59 | 57 | 58 | 58 | 58 | 59 | 59 | 67 | 57 | 54 | 55 |
| Elasticity | 22° C. % | 11 | 6 | 13 | 6 | 5 | 7 | 10 | 30 | 6 | 8 | 20 |
| | 75° C. % | 51 | 48 | 49 | 42 | 48 | ,46 | 51 | 45 | 40 | 47 | 46 |
| Damping maximum | °C. max | +1 | +4 | −8 | +8 | +5 | +6 | 0 | −8 | — | — | −16 |
| Tg | | — | −4 | — | −2 | −11 | — | — | — | −5 | −5 | — |
| Goodrich-Flexometer T | °C. | — | — | +43 | — | — | — | — | — | — | — | +54 |
| Ball fatigue test | 150N | 97 | 107 | 96 | 111 | 103 | 103 | 102 | 115 | 126 | 115 | |
| | 200N | 126 | 127 | 113 | 137 | 121 | 126 | 131 | 147 | 161 | 151 | |
| | 250N | 156 | 156 | 137 | 161 | 142 | 147 | 164 | — | — | 183 | |
| | 300N | — | — | 153 | — | — | — | — | | | | |
| | 350N | | | — | | | | | | | | |

TABLE 5-continued

| | Characteristics of the polymers | | | | | | | | | | |
|---|---|---|---|---|---|---|---|---|---|---|---|
| | Examples | | | | | | | Comparative Examples | | | |
| | 1 | 2 | 3 | 4 | 5 | 6 | 7 | A | B | C | D |
| Nominal value abrasion according to formula | 203 | 236 | 190 | 236 | 242 | 229 | 210 | 80 | 236 | 223 | 145 |

What is claimed as new and desired to be secured by Letters Patent of the U.S. is:

1. A statistical, unsaturated two-block copolymer comprising:
   25 to 75 .% 1,3-butadiene, 5 to 65 wt.% isoprene, and 3 to 35% wt.% styrene, wherein the amounts of butadiene, isoprene and styrene add up to 100 wt.%, said copolymer comprising
   (i) a block $A_1$, which contains 50–100 wt.% butadiene monomer units having a content of uniformly distributed vinyl groups of 8 to 40% as well as 1,4-trans and 1,4-cis units in a ratio less than 2 and greater than 1, 15–0 wt.% styrene monomer units and 20–0 wt.% isoprene monomer units having a 1,4 content of at least 60%, or
   (ii) a block $A_2$ which contains 50–95 wt.% butadiene monomer units, 3–40 wt.% isoprene monomer units and 2–15 wt.% styrene monomers units, wherein the butadiene monomer units have a content of vinyl and isopropenyl groups of 8 to 40%, and
   (iii) a block B which contains 3–65 wt.% butadiene monomer units, at least 16 wt.% isoprene monomer units and 3 to 45 wt.% styrene monomer units, wherein the butadiene monomer units have a content of vinyl and isopropenyl groups of 45% to 90%, wherein the content of block $A_1$ is at least 5 wt.% and less than 40 wt.%, the content of block $A_2$ is at least 5 wt.% and less than 30 wt.% and wherein said copolymer blocks are compatible, exhibiting a single phase in a tan δ vs. temperature curve, and exhibit a single damping maximum, where the single damping maximum of the two copolymer blocks is in the range of −45° C. to +15° C.

2. The copolymer according to claim 1, wherein the damping maximum is between −40° C. and +10° C.

3. The copolymer according to claim 1, wherein said copolymer is branched.

4. A process for the manufacture of the $A_1B$ and $A_2B$ block copolymer according to claim 1 by anionic polymerization of the monomers in an inert organic solvent in the presence of a organolithium compound, comprising the steps of:
   a) initially polymerizing the monomers of the block $A_1$ or $A_2$,
   b) then polymerizing a block B in the presence of $A_1$ or $A_2$ by polymerizing a mixture of butadiene, isoprene and styrene in the presence of a cocatalyst.

5. The process according to claim 4, wherein the entire amount of butadiene required for said two-block copolymer is present during said initially polymerizing step.

6. The process according to claim 4, wherein said block $A_1$ or $A_2$ and block B are polymerized in the presence of a catalyst comprising a monofunctional organolithium compound.

7. The process according to claim 4, wherein said block $A_1$ or $A_2$ and said block B are polymerized in the presence of a cocatalyst comprising a glycol ether of the formula $R_1$-$(O$-$CH_2$-$CH_2)_n$-$O$-$R_2$, wherein n is 1 or 2 and $R_1$ and $R_2$ are each $C_{1-4}$ alkyl.

8. The process according to claim 7, wherein n is 1 and $R_1$ and $R_2$ are mutually different.

9. The process according to claim 4, further comprising reacting block $A_1$ or $A_2$ with a coupling agent followed by polymerization of block B to produce branched or star-shaped block copolymers.

10. The process of claim 9, wherein said coupling agent is selected from the group consisting of polyepoxides, polyisocyanates, polyketones, polyanhydrides, tetrahalides of the elements Si, Ge, Sn and Pb, compounds of the formula $R_n(SiX_3)n$, wherein n = 1-6, X is a halogen and R is an aliphatic, cycloaliphatic or aromatic group having 6–16 carbon atoms, compounds of the formula $R'_2SiX_2$ wherein R' is a $C_{1-10}$ alkyl group, halogen hydrosilanes of the formula $Si(H)_m (X)_{4-m}$ wherein m is 1–3, divinylbenzenes and trivinylbenzenes.

11. The process according to claim 10, wherein said coupling agent is divinylbenzene.

12. A vulcanizable composition comprising at least 15 parts by weight of the block copolymer of claim 1, 95–5 parts by weight of an elastomer which is different from said copolymer having a glass transition temperature below −30° C. and selected from the group consisting of natural rubbers, diene rubbers and styrene-butadiene rubbers, 40–80 parts by weight of a filler selected from the group consisting of reinforcing carbon blacks, silicates and pyrogenous silicic acids, and up to 5 parts by weight of a vulcanizing system comprising a vulcanizing agent or a mixture of a vulcanizing agent and a vulcanizing activator.

* * * * *